(12) United States Patent
Hoeward et al.

(10) Patent No.: US 9,798,506 B2
(45) Date of Patent: Oct. 24, 2017

(54) METHOD FOR SCHEDULING A RELOAD OF SUPPLY MATERIAL IN A PRINTING SYSTEM

(71) Applicant: OCE-TECHNOLOGIES B.V., Venlo (NL)

(72) Inventors: William E. P. P. Hoeward, Venlo (NL); Roel W. A. Van Bakel, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/170,311

(22) Filed: Jun. 1, 2016

(65) Prior Publication Data

US 2016/0364186 A1 Dec. 15, 2016

(30) Foreign Application Priority Data

Jun. 10, 2015 (EP) .................................... 15171459

(51) Int. Cl.
*G06F 3/12* (2006.01)
*G03G 15/00* (2006.01)

(52) U.S. Cl.
CPC ........... *G06F 3/126* (2013.01); *G03G 15/553* (2013.01); *G03G 15/6508* (2013.01);
(Continued)

(58) Field of Classification Search
None
See application file for complete search history.

(56) References Cited

U.S. PATENT DOCUMENTS 8,285,168 B2 * 10/2012 Ikeda ................. G03G 15/6508
399/81
9,030,690 B2 * 5/2015 Fukuda ................. G06F 3/1263
358/1.14

(Continued)

FOREIGN PATENT DOCUMENTS

EP 2 309 714 A2 4/2011

*Primary Examiner* — Paul F Payer
(74) *Attorney, Agent, or Firm* — Birch, Stewart, Kolasch & Birch, LLP (57) ABSTRACT

A method for scheduling a reload of a supply material in a printing system including a print engine capable of printing at a settable print velocity while using the supply material, a control unit for controlling a print job queue comprising at least one print job scheduled to be printed by means of a scheduling scheme while using the supply material, a supply material input holder for holding the supply material, and a user interface for interacting with a user of the printing system. The method includes determining a plurality of moments in time that the supply material input holder is empty, and simultaneously scheduling for each determined moment in time of the plurality of moments in time a reload event of reloading the supply material input holder with the supply material in the scheduling scheme. The plurality of moments in time is determined by taking into account the total planned usage of the supply material from the supply material input holder according to print job specifications of the at least one print job scheduled in the print job queue and a capacity of the supply material input holder with respect to the properties of the supply material, and each of the determined moments in time is established on the basis of the settable print velocity of the printing system with respect to the at least one print job in the print job queue.

11 Claims, 7 Drawing Sheets

(52) U.S. Cl.
CPC ............ *G06F 3/121* (2013.01); *G06F 3/1253* (2013.01); *G06F 3/1296* (2013.01)

(56) References Cited

U.S. PATENT DOCUMENTS

| | | | |
|---|---|---|---|
| 9,344,591 B2* | 5/2016 | Konuma | ............ H04N 1/00408 |
| 2004/0218196 A1* | 11/2004 | Van Vliembergen | .. G06K 15/00 |
| | | | 358/1.6 |
| 2011/0052240 A1 | 3/2011 | Ikeda | |
| 2014/0355031 A1 | 12/2014 | Fukuda | |
| 2015/0093049 A1* | 4/2015 | Roumier | ............... G06F 3/1205 |
| | | | 382/311 |

* cited by examiner

METHOD FOR SCHEDULING A RELOAD OF SUPPLY MATERIAL IN A PRINTING SYSTEM

FIELD OF THE INVENTION

The present invention relates to a method for scheduling a reload of a supply material in a printing system, the printing system comprising a print engine capable of printing at a sellable print velocity while using the supply material, a control unit for controlling a print job queue comprising at least one print job scheduled to be printed by means of a scheduling scheme while using the supply material, a supply material input holder for holding the supply material, and a user interface for interacting with a user of the printing system.

The present invention further relates to a printing system configured to apply the method according to the invention.

BACKGROUND OF THE INVENTION

Nowadays print systems provide an estimated required amount of supply material per print job. Print systems also provide a current status of the supply material levels in the printing system, for example in volume percentage of the supply material input holder or in weight percentage of a fully loaded supply material input holder. Nowadays print systems also provide a job schedule of scheduled jobs in time ahead. Nowadays on print systems also a maintenance action like reloading has to be carried out when the supply material input holder becomes empty. However, the operator wants to plan further in time, for example he wants to plan maintenance actions for a complete print job queue of scheduled print jobs.

A supply material may be an image recording material for printing a digital image upon. Such an image recording material may be paper, plastic, overhead film, transparent material, textile, hard board, wood, etc. The image recording material may be in the form of sheets or rolls. The supply material input holder for the image recording material may be an input holder for sheets or a roll, for example a tray, a roll holder, etc.

A supply material may be a marking material to be deposited on the image recording material. Such a marking material may be toner, metal, ink or other fluidal material. The marking material may be in the form of drops or particles. The supply material input holder for the marking material may be a toner container like a toner bottle, an ink container like an ink cartridge, an ink bag, etc.

A supply material may be a finishing material used when finishing the printed product. Such a finishing material may be a staple, a paper clip, a binder, glue, or other finishing material. The supply material input holder for the finishing material may be a staple holder, a paper clip holder, a binder holder, a glue syringe, etc.

The printing system may be an inkjet printing system, an electro-graphical printing system, a nano-particle printing system, etc. The printing system may be suitable for printing on sheets of image recording material and/or on rolls of image recording material.

It is an objective of the present invention to provide a method for accurately predicting the moment that a supply material input holder becomes empty.

SUMMARY OF THE INVENTION

According to the present invention the objective is achieved by the method as described here-above, wherein the method comprises the steps of a) determining a plurality of moments in time that the supply material input holder is empty, and b) simultaneously scheduling for each determined moment in time of the plurality of moments in time a reload event of reloading the supply material input holder with the supply material in the scheduling scheme, wherein the plurality of moments in time is determined by taking into account the total planned usage of the supply material from the supply material input holder according to print job specifications of the at least one print job scheduled in the print job queue and a capacity of the supply material input holder with respect to the properties of the supply material, and each of the determined moments in time is established on the basis of the settable print velocity of the printing system with respect to the at least one print job in the print job queue.

By scheduling the plurality of moments the operator is able to look beyond the first moment in time of the supply material input holder to become empty. With the capacity of the supply material input holder is meant a maximum used capacity for a reload of the supply material input holder. The capacity is usually measured in an amount of pieces of supply material to be loaded, a volume of the supply material loaded or a weight of the supply material to be loaded.

According to an embodiment the printing system comprises a plurality of supply material input holders and the method comprises the steps of assigning each supply material input holder of the plurality of supply material input holders to a kind of supply material and applying the steps a)-b) for each supply material input holder of the plurality of supply material input holders. A kind of supply material may be an image recording material, a marking material and/or a finishing material. Further, two kinds of supply material may also be two kinds of image receiving material, each having a different property with respect to weight, size, colour, permeability, etc. Further, two kinds of supply material may also be two kinds of marking material, each having a different property with respect to weight, drop size, particle size, colour, permeability, liquidity, etc. Further, two kinds of supply material may also be two kinds of fishing material for different finishing actions to be applied on a printed product.

According to an embodiment the method comprises the step of displaying the scheduling scheme at the user interface including the display of the plurality of the scheduled reload events.

According to an embodiment the method comprises the step of notifying the operator of the printing system by means of the user interface for each scheduled reload event when the moment in time of the scheduled reload event is near.

According to an embodiment the method comprises the step of receiving a percentage of the capacity of the supply material input holder, which percentage is used for determining the degree of reload at each of the plurality of moments in time. This is advantageous since a refill of the supply material input holder at a percentage of the capacity of the supply material input holder may decrease a chance on print errors, like paper jams, ink pollution, etc.

According to an embodiment the method comprises the step of receiving an amount of supply material, which amount is default for reloading the supply material input holder at the plurality of determined moments in time. For example, if the operator usually loads a plurality of packages and each package comprises 500 sheets of supply material, the amount may be set to a multiple of 500 sheets. The amount may be set by the operator by means of the user interface of the printing system or may be set as a default setting of the printing system.

According to an embodiment the method comprises the steps of establishing an uncertainty time period for the reload event to take place and for each scheduled reload event displaying the corresponding uncertainty period at the user interface.

According to an embodiment the method comprises the step of for a reload event accumulating the uncertainty periods of the determined moments in time before and including the reload event and for the reload event displaying the accumulated uncertainty periods at the user interface.

The invention also relates to printing system comprising a print engine capable of printing at a settable print velocity while using a supply material, a control unit for controlling a print job queue comprising at least one print job scheduled to be printed by means of a scheduling scheme using the supply material, a supply material input holder for holding the supply material, and a user interface for interacting with a user of the printing system, wherein the control unit is configured a) to determine a plurality of moments in time that the supply material input holder is empty, and b) to simultaneously schedule for each determined moment in time of the plurality of moments in time a reload event of reloading the supply material input holder with the supply material in the scheduling scheme, wherein the plurality of moments in time is determined by taking into account the total planned usage of the supply material from the supply material input holder according to print job specifications of the at least one print job scheduled in the print job queue and a capacity of the supply material input holder with respect to the supply material, and each of the determined moments in time is established on the basis of the settable print velocity of the print engine with respect to the at least one print job in the print job queue.

According to an embodiment the printing system comprises a plurality of supply material input holders, and the control unit is configured to assign each supply holder of the plurality of supply material input holders to a kind of supply material and to apply actions a)-b) for each supply material input holder of the plurality of supply material input holders.

The invention also relates to a recording medium comprising computer executable program code configured to instruct a computer to perform the method according to the invention in a printing system according to the invention.

The invention may also be applied to recurring depletions of supply material output holders of the printing system instead of recurring reloads of supply input holders of the printing system.

Therefore, the present invention pertains to:

1. Method for scheduling a depletion of a supply material in a printing system, the printing system comprising a print engine capable of printing at a settable print velocity while using the supply material, a control unit for controlling a print job queue comprising at least one print job scheduled to be printed by means of a scheduling scheme while using the supply material, a supply material output holder for holding the supply material, and a user interface for interacting with a user of the printing system, the method comprising the steps of a) determining a plurality of moments in time that the supply material output holder is full, and b) simultaneously scheduling for each determined moment in time of the plurality of moments in time a depletion event of emptying the supply material output holder in the scheduling scheme, wherein the plurality of moments in time is determined by taking into account the total planned usage of the supply material according to print job specifications of the at least one print job scheduled in the print job queue and a capacity of the supply material output holder with respect to the properties of the supply material, and each of the determined moments in time is established on the basis of the settable print velocity of the printing system with respect to the at least one print job in the print job queue.

2. Method according to 1, wherein the printing system comprises a plurality of supply material output holders and the method comprises the step of applying the steps a)-b) for each supply material output holder of the plurality of supply material output holders.

3. Method according to 1 or 2, wherein the method comprises the step of displaying the scheduling scheme at the user interface including the display of the plurality of scheduled depletion events.

4. Method according to 1-3, wherein the method comprises the step of notifying the operator of the printing system by means of the user interface for each scheduled depletion event when the moment in time of the scheduled depletion event is near.

5. Method according to 1-4, wherein the method comprises the step of receiving a percentage of the capacity of the supply material output holder, which percentage is used for determining the degree of depletion at each of the plurality of moments in time.

6. Method according to 1-5, wherein the method comprises the step of receiving a value of an amount of supply material, which amount is default for emptying the supply material output holder at the plurality of determined moments in time.

7. Method according to 3, wherein the method comprises the steps of establishing an uncertainty time period for the depletion event to take place and for each scheduled depletion event displaying the corresponding uncertainty period at the user interface.

8. Method according to 7, wherein the method comprises the step of for a depletion event accumulating the uncertainty periods of the determined moments in time before and including the depletion event and for a depletion event displaying the accumulated uncertainty periods at the user interface.

9. Printing system comprising a print engine capable of printing at a settable print velocity while using a supply material, a control unit for controlling a print job queue comprising at least one print job scheduled to be printed by means of a scheduling scheme using the supply material, a supply material output holder for holding the supply material, and a user interface for interacting with a user of the printing system, wherein the control unit is configured a) to determine a plurality of moments in time that the supply material output holder is full, and b) to simultaneously schedule for each determined moment in time of the plurality of moments in time a depletion event of emptying the supply material output holder in the scheduling scheme, wherein the plurality of moments in time is determined by taking into account the total planned usage of the supply material according to print job specifications of the at least one print job scheduled in the print job queue and a capacity of the supply material output holder with respect to the supply material, and each of the determined moments in time is established on the basis of the settable print velocity of the print engine with respect to the at least one print job in the print job queue.

10. Printing system according to 9, wherein the printing system comprises a plurality of supply material output holders, and the control unit is configured to apply actions a)-b) for each supply material output holder of the plurality of supply material output holders.

11. Recording medium comprising computer executable program code configured to instruct a computer to perform the method according to any of 1-8 in a printing system according to any of 9-10.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

DETAILED DESCRIPTION OF THE EMBODIMENTS

The present invention will now be described with reference to the accompanying drawings, wherein the same or similar elements are identified with the same reference numerals throughout the several views.

The embodiments are explained by taking in the examples a printing system comprising a print head or print assembly, like an inkjet printing system or an electro-photographical printing system. In principal a printing system in which any kind of image recording material, any kind of marking material, and, if needed, any kind of finishing material is to be loaded and the kind of marking material is to be printed on the kind of image recording material may be configured to use the methods according to the embodiments of the present invention.

Figure 1:
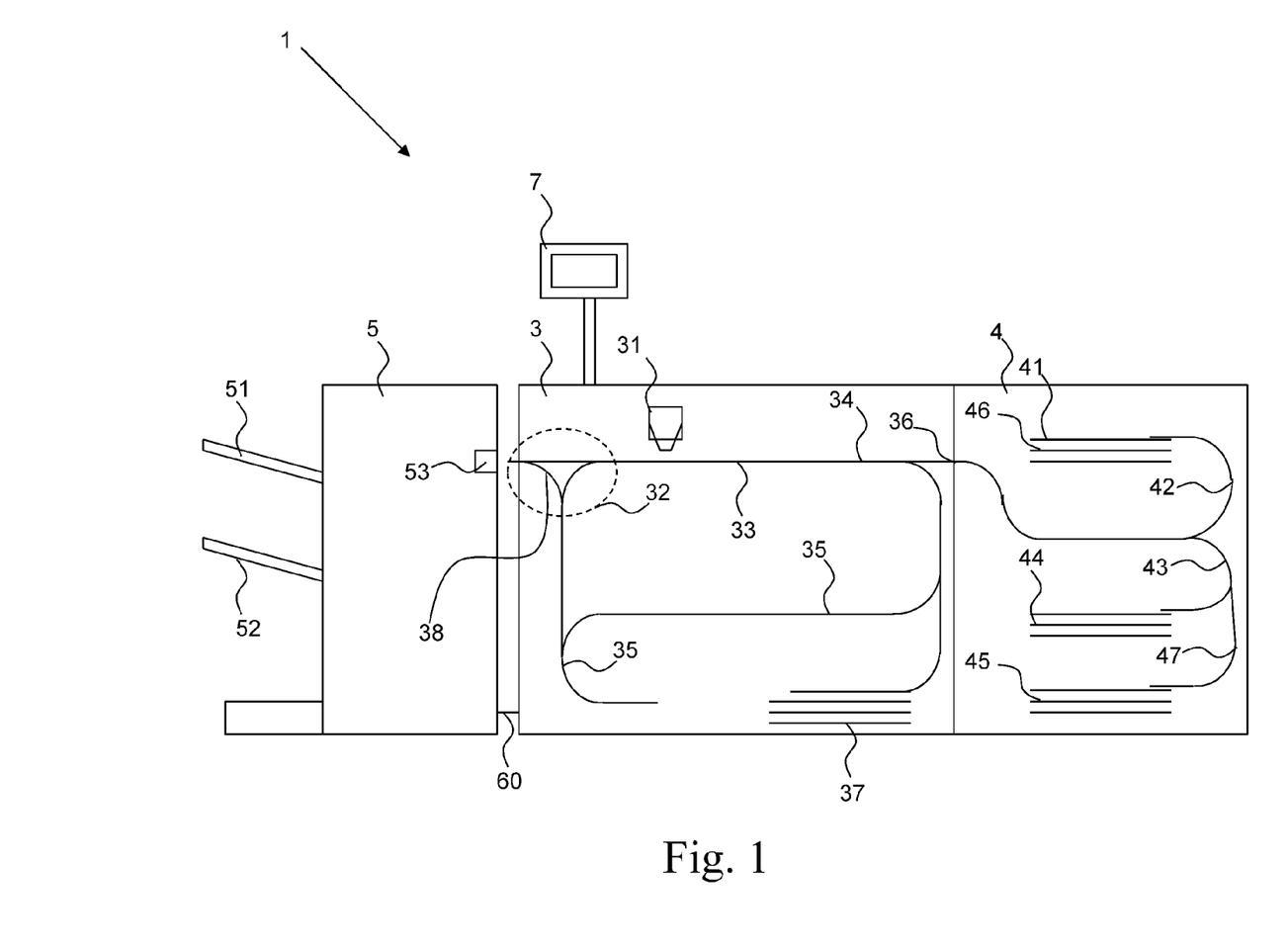
FIG. 1 shows a schematic view of a printing system configured to use the method according to the invention.

FIG. 1 shows schematically a printing system 1 in which the method according to the invention is applicable. The printing system 1 comprises an output section 5, a print engine and control section 3 possibly containing one or more input sections 37, a local user interface 7 and an input section 4.

The output section comprises two supply material output holders 51, 52 for holding printed image recording material. The printed image recording material is transported from the print engine and control section 3 via an inlet 53 to the output section 5. The output section 5 is digitally connected by means of a cable 60 to the print engine and control section 3 for bi-directional data signal transfer. Other supply material output holders may be envisioned, for example a supply material output holder for residuals of ink or toner or a supply material output holder for waste paper in case of drilling actions, cutting actions or perforating actions. Depletions of such a supply material output holder may be scheduled according to the method of the invention.

The print engine and control section 3 comprises a print engine and a control unit (not shown) for controlling the printing process. The control unit is a computer or server or a workstation, connected to the print engine and connected to the digital environment of the printing system, for example a network for transmitting a submitted print job to the printing system. The print engine comprises a print head or print assembly 31 for ejecting or fixing marking material to image recording material and a paper path 34, 32, 35 for transporting the image recording material from an entry point 36 of the print engine and control section 3 to the inlet 53 of the output section 5. The print head or print assembly 31 is positioned near the paper path section 34. While an image recording material is transported along the paper path section 34, the image recording material receives the marking material from the print head or print assembly 31. A next paper path section 32 is a flip unit for selecting a different subsequent paper path for simplex or duplex printing of the image recording material. The flip unit 32 may be also used to flip a printed sheet of image recording material after printing in simplex mode before the printed sheet leaves the print engine and control section 3 via a curved section 38 of the flip unit 32 and via the inlet 53 to the output section 5. In another embodiment of the printing system the curved section 38 of the flip unit 32 is not present and the turning of a simplex page has to be done via another paper path section 35 and leads to productivity loss. In another embodiment of the printing system an additional turning station—partly to replace the curved section 38 of the flip unit 32—is configured outside the print engine and control section 3 between the print engine and control section 3 and the output section 5.

When the image recording material has to be printed in a simplex mode, the image recording material may directly by transported via the flip unit 32 to the inlet 53 of the output section 5.

When the image recording material has to be printed in a duplex mode, the image recording material is transported via the flip unit 32 to the other paper path section 35 for turning the image recording material in order to switch front side and back side of the sheets. The sheets are then transported to the paper path section 34 again for printing on the rear side of the sheets by means of the print head or print assembly 31.

The print engine and control section 3 also comprises an additional input holder 37 for holding image recording material. Image recording material may have to be input in the additional input holder 37 in another orientation than an input orientation for the image recording material holders 44, 45, 46.

The input section 4 comprises a plurality of supply material input holders 44, 45, 46 for holding the image recording material before transporting the sheets of image recording material to the print engine and control section 3. Sheets of image recording material are guided from the supply material input holders 44, 45, 46 by guiding means 42, 43, 47 to an outlet 36 for entrance in the print engine and control section 3. Sheets of image recording material are now guided from the supply material input holders 44, 45, 46 to the right side of the supply material input holders 44, 45, 46, but other configurations of the supply material input holders may be envisioned for at least partly guiding the sheets to the left side. For these other configurations a suitable instruction for face up or face down loading of the image recording material in the respective supply material input holder will be generated by the control unit.

FIG. 1 shows a plurality of supply material input holders. The invention, however, also applies to a printing system for only one supply material input holder.

FIG. 1 shows a plurality of supply material output holders. The invention, however, also applies to a printing system for only one supply material output holder.

Figure 2:
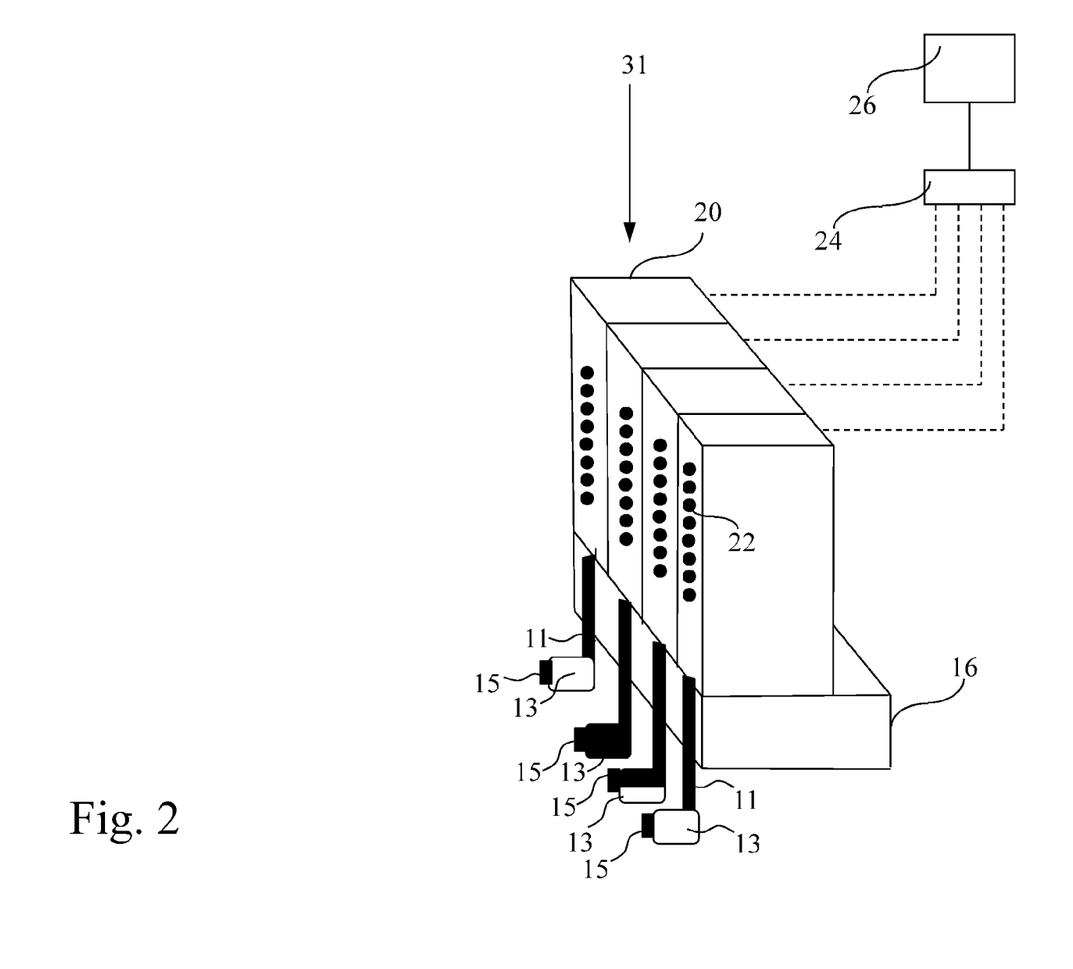
FIG. 2 shows a print head unit of a printing system according to the invention.

FIG. 2 depicts schematically a print head unit 31 of an ink jet printer according to an embodiment of the invention. Recording material may be transported past the print head unit 31. The print head unit 31 is mounted on a carriage 16 that is guided on guide rails (not shown) and is relatively movable to the recording material. In the example shown, the print head unit 31 comprises four print heads 20, one for each of the basic colours cyan, magenta, yellow and black. Each print head has a linear array of nozzles 22. The nozzles 22 of the print heads 20 can be energised individually to eject ink droplets onto the recording material, thereby to print a pixel on the recording material. The nozzles 22 are provided with ink by means of conducts 11 which are connected to ink containers 13, one container for each colour of ink. The ink containers 13 are shown as small rectangles. In reality the ink containers may be larger in comparison to the print heads 20. Attached to an ink container 13 is a level sensor 15 for detecting a level of ink in the ink container 13, for example to detect that the ink container is empty. When the carriage 16 is moved across a width of the recording material, a swath of an image can be printed. The number of pixel lines of the swath corresponds to the number of nozzles 22 of each print head. When the carriage 16 has completed one pass, the recording material may be advanced by the width of the swath, so that the next swath can be printed. Besides a printing system printing in swathes, a single pass printing system may also be envisioned. A page wide print head unit may also be envisioned.

The print heads 20 are controlled by a print head controller 24 which receives rasterized print data from an image processor 26 that is capable of high speed image processing. The image processor 26 may be incorporated in the printer or in a remote device, e. g. a print driver in a host computer. The print head controller 24 and the image processor 26 process the print data in a ripping process. Print jobs comprising image data are received by the image processor 26 and rasterized. The rasterized images are submitted to the print head controller 24. The print head controller 24 controls the print heads 20 in order to eject ink from the print heads 20. The ejected ink material establishes an image according to the rasterized image on the receiving material. The print head controller 24 also controls the maintenance actions to be performed regarding the print head. Nozzles may be wiped, ink may be purged using ink from the ink containers 13 in a purge unit (not shown) besides the carriage 16. Calibration test cards may be printed using ink from the ink containers 13.

FIG. 2 shows a plurality of ink containers. The invention, however, also applies to a printing system for only one ink container, for example in a black and white printing system.

Figure 3:
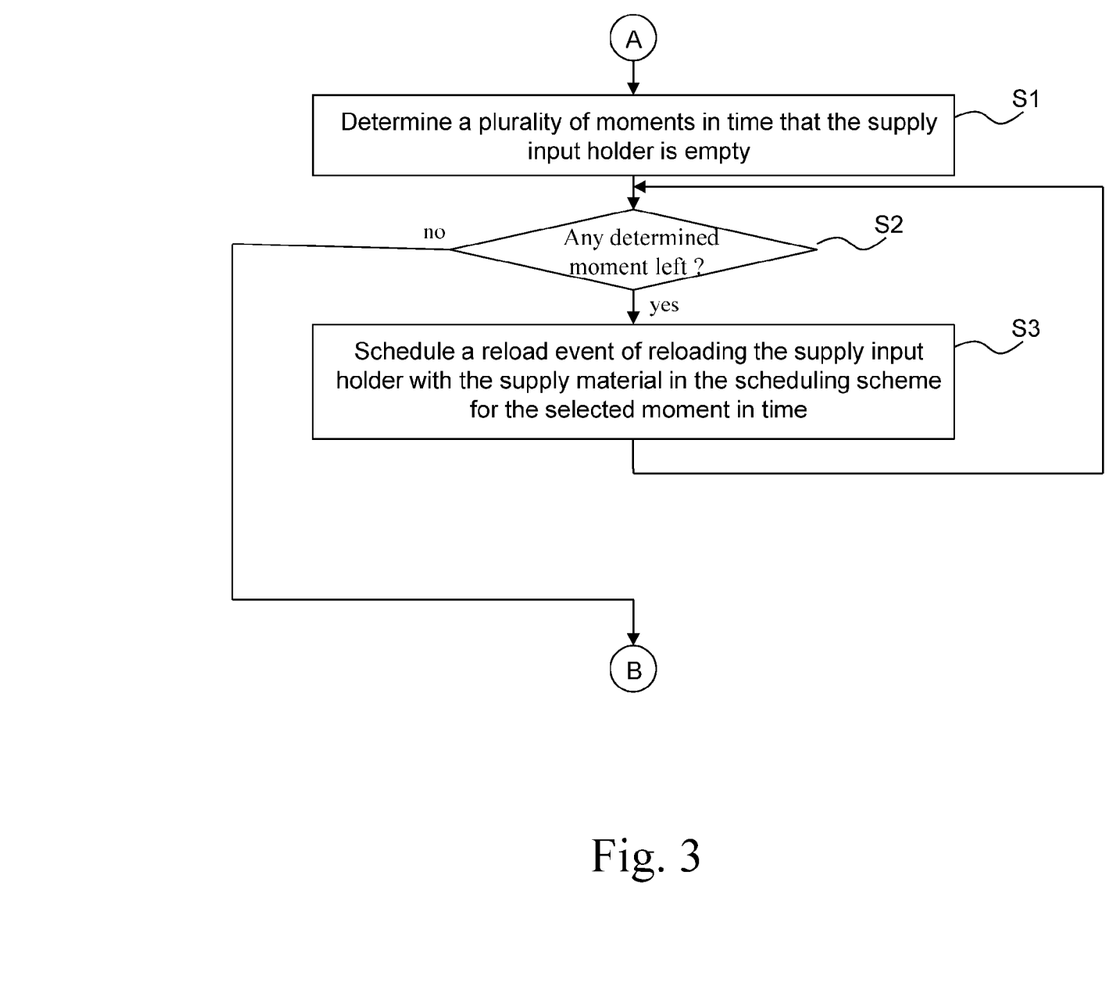
FIG. 3 shows a diagram of an embodiment of the method according to the invention.

FIG. 3 shows a diagram of an embodiment of the method according to the invention. A consumption of supply material for at least one print job submitted to the printing system according to the invention is predicted. A print job consumes supply material from at least one supply material input holder in the printing system.

The print job queue of the printing system comprises at least one print job. Usually a plurality of print jobs is scheduled in time. Scheduling of jobs may take place in a control unit of the printing system. The control unit may be a computer device at, near or remote from a printing unit of the printing system. Scheduling principles like First-In-First-Out (FIFO) or Last-In-First-Out (LIFO) may be applied. As an example, two print jobs are scheduled: Job1 and Job2. Job1 concerns 10000 A4 color (CMYK) prints in a simplex print mode. Job2 concerns 3000 A4 color (CMYK) prints in a duplex print mode. In this example paper is used as the supply material to be consumed, but the method according to the invention is also applicable to other previously mentioned supply materials. It is assumed that the supply material input holder has a capacity of 2000 A4 size sheets of paper.

A starting point A leads to a first step S1 of the method.

According to a first step S1 a plurality of moments in time is determined that the supply material input holder is empty. A total planned usage of the supply material from the supply material input holder according to print job specifications of the at least one print job scheduled in the print job queue is determined. Further the capacity of the supply material input holder is known to the printing system. Also a print velocity set for the print jobs Job1, Job2 is known to the printing system. By using all this information the printing system, in particular the control unit, is able to establish each of the determined moments in time that the supply material input holder is empty.

In the example, the print velocity is set to 100 pages per minute for the first print job Job1 in a simplex print mode, and to 50 pages per minute for the second print job Job2 in a duplex print mode. Printing is supposed to be started at start moment of time 00:00h.

A first moment in time that the supply material input holder will be empty is after printing 2000 A4's for the first print job Job1. This will be at 2000/100=20 minutes from the start moment in time, i.e. 00:20 h.

A second moment in time that the supply material input holder will be empty is after printing 4000 A4's for the first print job Job1. This will be at 4000/100=40 minutes from the start moment in time, i.e. 00:40 h.

A third moment in time that the supply material input holder will be empty is after printing 6000 A4's for the first print job Job1. This will be at 6000/100=60 minutes from the start moment in time, i.e. 01:00 h.

A fourth moment in time that the supply material input holder will be empty is after printing 8000 A4's for the first print job Job1. This will be at 8000/100=80 minutes from the start moment in time, i.e. 01:20 h.

A fifth moment in time that the supply material input holder will be empty is after printing 10000 A4's for the first print job Job1. This will be at 10000/100=100 minutes from the start moment in time, i.e. 01:40 h.

A sixth moment in time that the supply material input holder will be empty is after printing 2000 A4's for the second print job Job2. This will be at 2000/50=40 minutes from 01:40 h., i.e. at 02:20 h.

The determined moments in time after the first moment in time apply to recurring refills of the supply material input holder. All the moments in time 00:20 h, 00:40 h, 01:00 h, 01:20 h, 01:40 h and 02:20 h are determined simultaneously in one moment at or near the start moment in time 00:00 h. All print jobs scheduled in a print job scheduling scheme are taken into account with respect to the print job specifications of the scheduled print jobs and set and/or specified print velocities for the scheduled print jobs.

The given example of Job1 and Job2 is rather uncomplicated for convenience reasons, but more complicated schedules of print jobs, number of supply materials and/or number of supply material input holders may be envisioned to fall in the scope of the invention.

For convenience reasons it is assumed in this example that the supply material input holder is refilled to its maximum capacity. If another- lower- capacity is used for refill, the lower capacity is taken into account when determining the moment in time of the first refill and the recurring refills.

For convenience reasons it is assumed in this example that one supply material input holder is used. The scope of the invention also extends to the use of a plurality of supply material input holders. If another supply material input holder is filled with the same supply material, the total amount of available supply material is calculated by summarizing over the amounts in the plurality of supply material input holders having the same supply material loaded.

At each moment in time—the first, second, third, fourth, fifth and sixth moment in time as mentioned here-above—the print jobs are scheduled again and the moments in time are again determined during and/or after the refill of the supply material input holder.

When a new print job is submitted to the printing system and arrives at the print job queue in the control unit, the new print job is scheduled and moments in time of recurring refills are established for the supply material to be used during printing of the new print job.

According to an embodiment the method comprises the step of receiving a percentage of the maximum capacity of the supply input holder, which percentage is used for determining the degree of reload at the determined moment in time. This is advantageous in case a refill at maximum capacity of the supply material input holder has a larger chance on print errors, like paper jams, ink pollution, etc. The percentage may be received via the user interface of the printing system by means of operator input or user input. The percentage may also be set as a system setting of the printing system.

In a second step S2 it is checked if there are determined moments in time left which are not yet scheduled. If there are no moments in time left, the method proceeds to the end point B. If there is still a moment in time to be scheduled, the method proceeds to a third step S3.

In a third step S3 a reload event of reloading the supply material input holder with the supply material is scheduled in the scheduling scheme for the selected moment in time.

Scheduling of the reload events may take place in the control unit of the printing system. Scheduling of a reload event may be on a time regular basis, for example at each reload of the supply material input holder or at each arrival of a new print job at the printing system. The scheduling of the reload events for the plurality of moments in time determined in the first step S1, is executed for all reload events together and anyway before the printing of the at least one scheduled print job.

In a further embodiment the method comprises the step of displaying the scheduling scheme at the user interface including a display of the plurality of the scheduled reload events. The display of the plurality of the scheduled reload events may be established by means of reload event display items.

Figure 4:
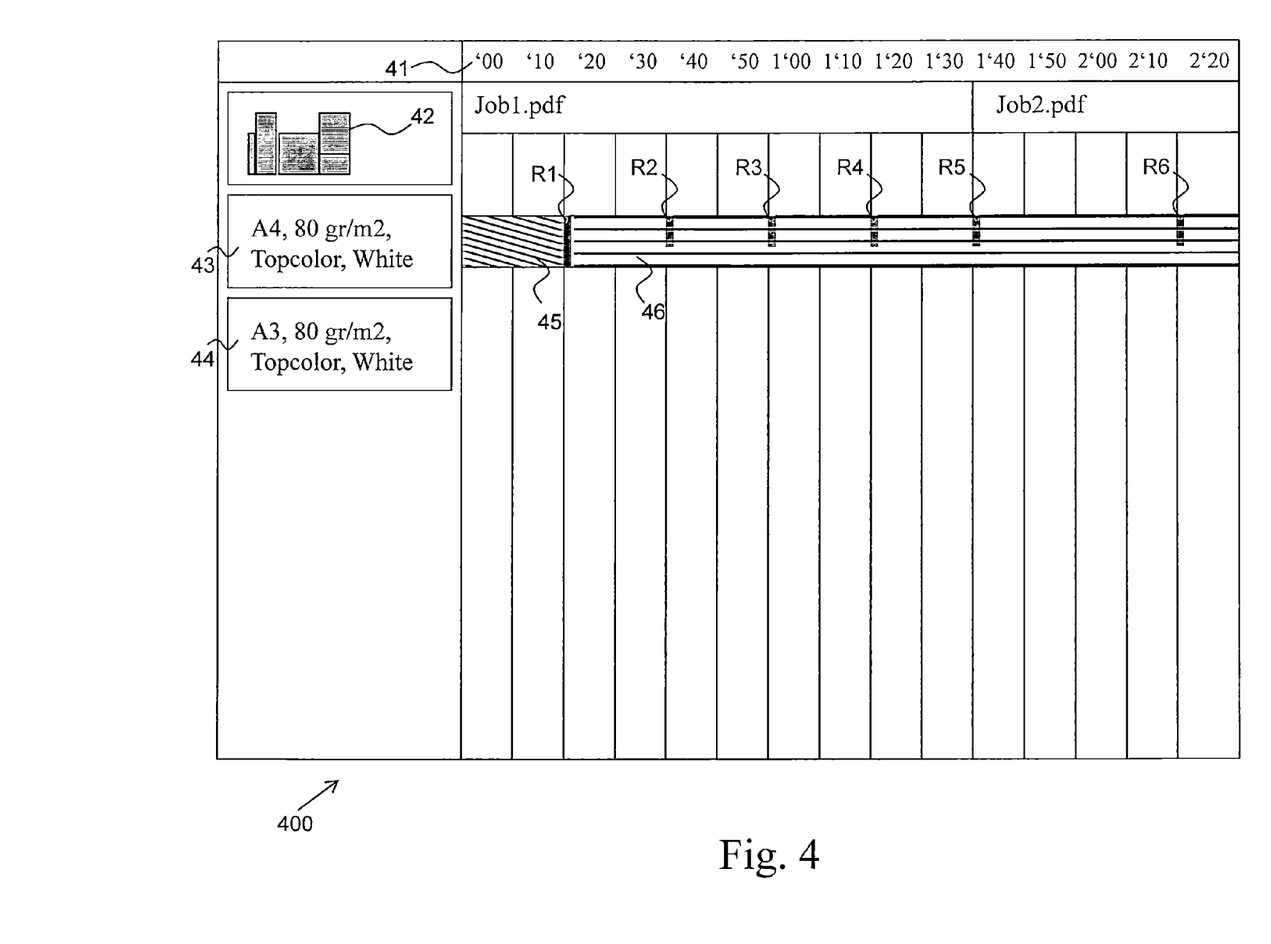
FIGS. 4-6 show user interface windows for the method according to the invention.

FIG. 4 shows a first user interface window 400 of the printing system according to the invention for the example of Job1 and Job2. The first user interface window 400 comprises a time line 41, a representation 42 of the printing system, a first supply material 43 and a second supply material 44. Job1 and Job2 make use of the first supply material 43. The supply material input holder holding the first supply material 43 is assumed to be fully loaded at the start time 00:00 h. A first area 45 represents a period of time until the first refill moment in time R1. The first area 45 may be coloured green in order to indicate that first supply material 43 for the first 2000 prints is available in the supply material input holder. The first refill moment in time R1 is indicated by a vertical bar, for example yellow coloured. A second area 46 represents a period of time after the first refill moment in time R1. The second area 46 may be orange coloured in order to indicate that refills of the first supply material 43 are necessary to print after the first refill moment in time R1. The recurrent refill moments in time R2-R6 are indicated by a half vertical bar, for example yellow coloured, in order to distinguish the recurrent refill moments in time R2-R6 from the first refill moment in time R1.

Figure 5:
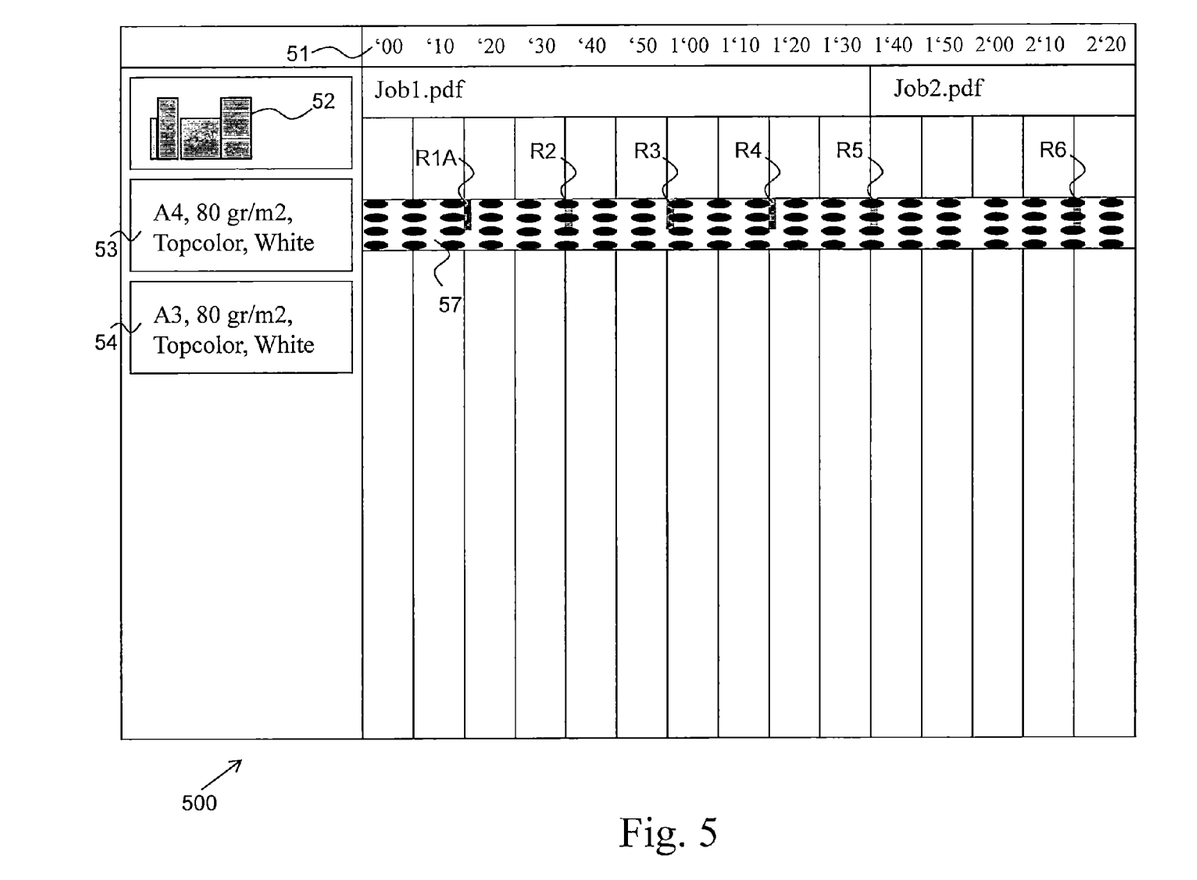

FIG. 5 shows a second user interface window 500 of the printing system according to the invention for the example of Job1 and Job2. The second user interface window 500 comprises a time line 51, a representation 52 of the printing system, a first supply material 53 and a second supply material 54, being similar to FIG. 4. Job1 and Job2 make use of the first supply material 53. The supply material input holder holding the first supply material 53 is assumed to be empty at the start time 00:00 h. An area 57 represents a period of time from the start moment in time 00:00 h until 02:40 h. The area 57 may be coloured red in order to indicate that first supply material 53 for Job1 and Job2 is not available in the supply material input holder. The first refill moment in time R1A is indicated by a half vertical bar, for example yellow coloured. The recurrent refill moments in time R2-R6 are also indicated by a half vertical bar, for example yellow coloured.

The display of the plurality of the scheduled reload events may be established by means of reload event display items, like vertical bars as in FIG. 4 and FIG. 5. Other shapes and colouring of the display items may be envisioned.

In a further embodiment the method comprises the step of taking into account an uncertainty time period around each reload event. The uncertainty time period is expressed by the width of the vertical bars R1, R1A, R2-R6 in FIG. 4 and FIG. 5. An uncertainty time period may be expressed in time units or in number of prints. The width of each of the vertical bars R1, R1A, R2-R6 represents the uncertainty period around the respective reload events. For example, it is substantially 100% certain that the reload event will take place in the uncertainty period around the reload event R1 indicated by the width of the vertical bar displayed at the reload event R1.

In a further embodiment the method comprises the step of taking accumulatively taking into account the uncertainty time periods around the reload events.

Figure 6:
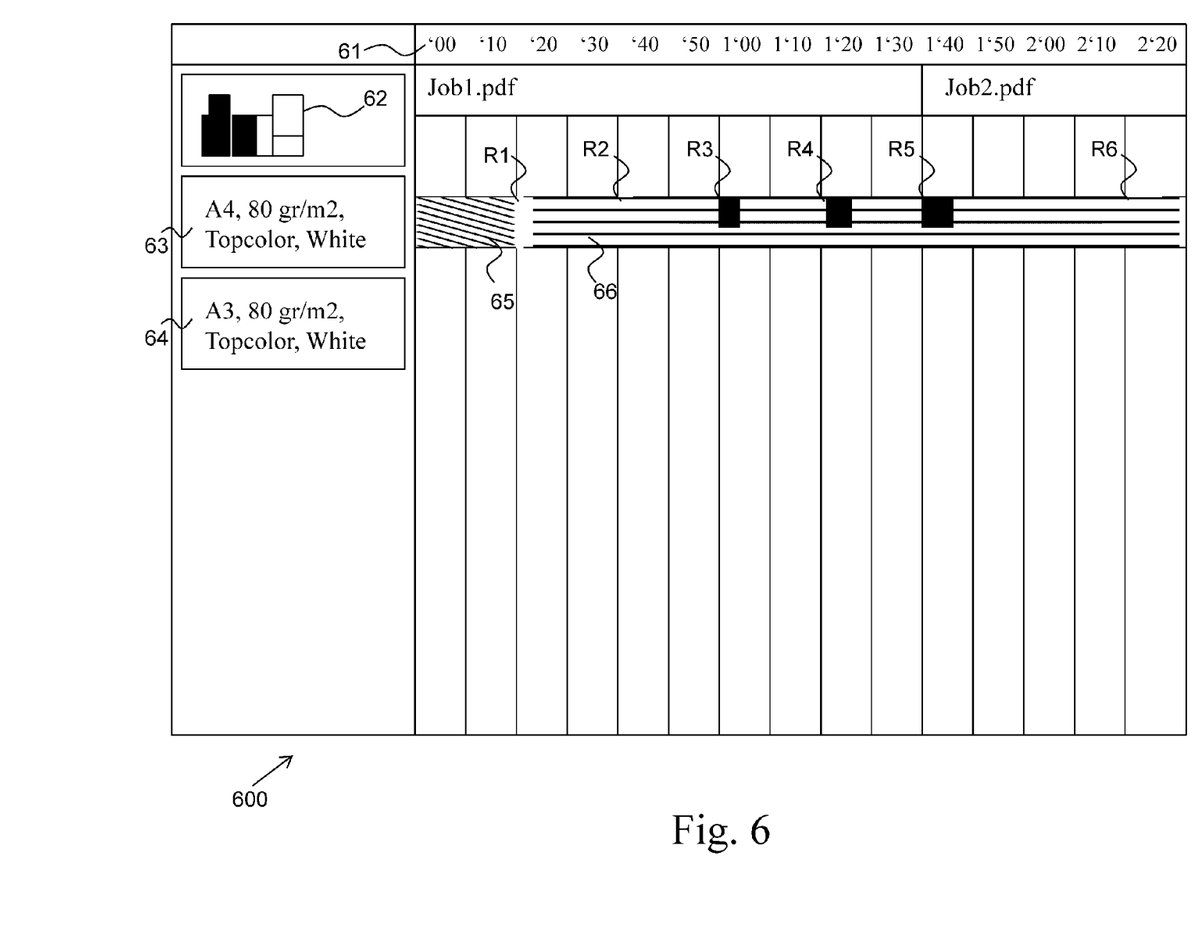

FIG. 6 shows a third user interface window 600 of the printing system according to the invention for the example of Job1 and Job2. The third user interface window 600 comprises a time line 61, a representation 62 of the printing system, a first supply material 63 and a second supply material 64 as in FIG. 4.

Job1 and Job2 make use of the first supply material 63. The supply material input holder holding the first supply material 63 is assumed to be fully loaded at the start time 00:00 h. A first area 65 represents a period of time until the first refill moment in time R1. The first area 65 may be coloured green in order to indicate that first supply material 63 for the first 2000 prints is available in the supply material input holder. The first refill moment in time R1 is indicated by a vertical bar, for example yellow coloured. A width of the vertical bar R1 is an indication for the size of the uncertainty period around the reload event at the first refill moment in time R1. A second area 66 represents a period of time after the first refill moment in time R1. The second area 66 may be orange coloured in order to indicate that refills of the first supply material 63 are necessary to print after the first refill moment in time R1. The recurrent refill moments in time R2-R6 are indicated by a half vertical bar, for example yellow coloured, in order to distinguish the recurrent refill moments in time R2-R6 from the first refill moment in time R1. A width of the vertical bar R2 is an indication for the size of the uncertainty period around the reload event at the second refill moment in time R2. The width of the vertical bar R2 is twice as large as the width of the vertical bar R1, since the uncertainty periods at moments in time R1, R2 are accumulated. A width of the vertical bar R3 is an indication for the size of the uncertainty period around the reload event at the third refill moment in time R3. The width of the vertical bar R3 is three times as large as the width of the vertical bar R1, since the uncertainty periods at the moments in time R1, R2, R3 are accumulated.

Figure 7:
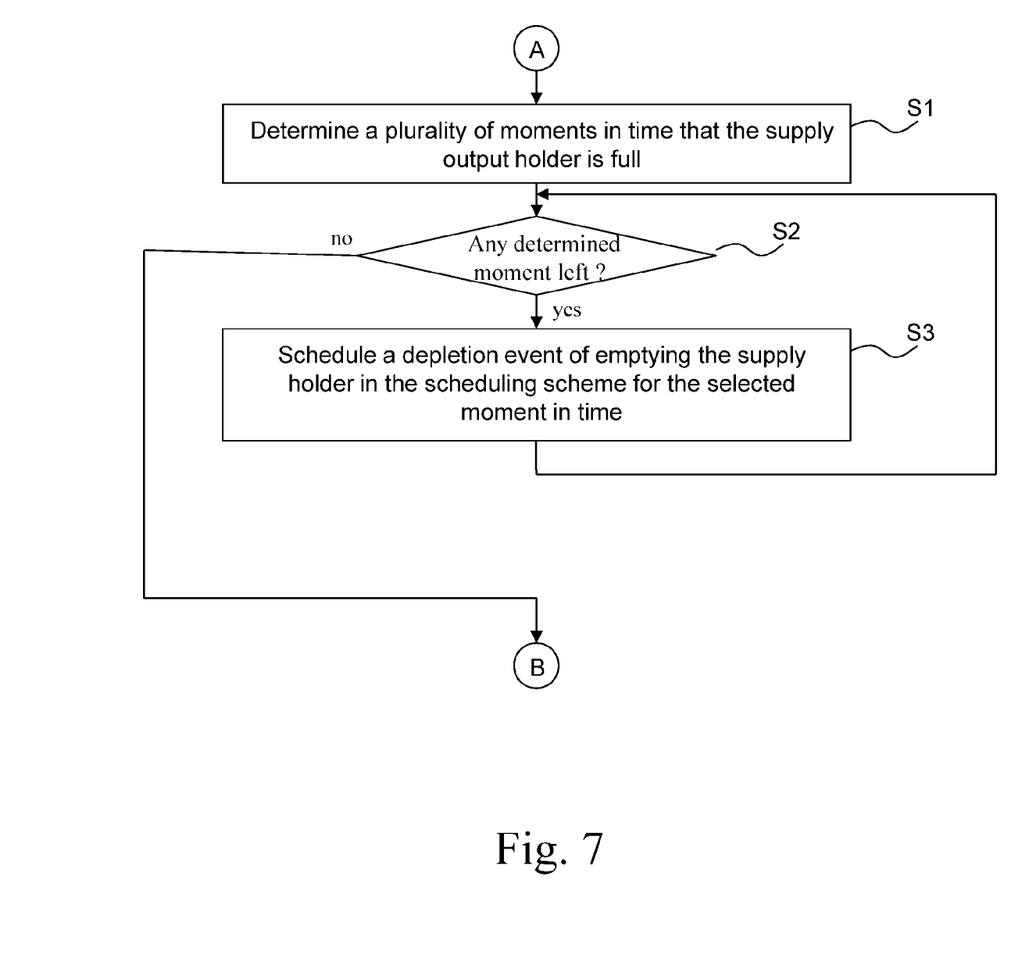
FIG. 7 shows a diagram of another embodiment of the method according to the invention.

FIG. 7 shows a diagram of another embodiment of the method according to the invention. A consumption of supply material for at least one print job submitted to the printing system according to the invention is predicted. A print job consumes supply material from at least one supply material input holder in the printing system. The supply material output holders are able to receive the printed end products, residuals of ink, residuals of toner and/or paper waste.

The print job queue of the printing system comprises at least one print job. Usually a plurality of print jobs is scheduled in time. Scheduling of jobs may take place in a control unit of the printing system. The control unit may be a computer device at, near or remote from a printing unit of the printing system. Scheduling principles like First-In-First-Out (FIFO) or Last-In-First-Out (LIFO) may be applied. As an example, two print jobs are scheduled: Job3 and Job4. Job3 concerns 10000 A4 color (CMYK) prints in a simplex print mode. Job4 concerns 3000 A4 color (CMYK) prints in a duplex print mode. In this example paper is used as the supply material to be consumed, but the method according to the invention is also applicable to other previously mentioned supply materials. It is assumed that the supply material output holder has a capacity of 2000 A4 size sheets of paper.

A starting point A leads to a first step S1 of the method.

According to a first step S1 a plurality of moments in time is determined that the supply material output holder is full. A total planned usage of the supply material from the supply material input holder according to print job specifications of the at least one print job scheduled in the print job queue is determined. Further the capacity of the supply material output holder is known to the printing system. Also a print velocity set for the print jobs Job3, Job4 is known to the printing system. By using all this information the printing system, in particular the control unit, is able to establish each of the determined moments in time that the supply material output holder is full.

In the example, the print velocity is set to 100 pages per minute for the third print job Job3 in a simplex print mode and to 50 pages per minute for the fourth print job Job4 in a duplex print mode. Printing is supposed to be started at start moment of time 00:00 h. A first moment in time that the supply material output holder will be full is after printing 2000 A4's for the third print job Job3. This will be at 2000/100=20 minutes from the start moment in time, i.e. 00:20 h.

A second moment in time that the supply material output holder will be full is after printing 4000 A4's for the third print job Job3. This will be at 4000/100=40 minutes from the start moment in time, i.e. 00:40 h.

A third moment in time that the supply material output holder will be full is after printing 6000 A4's for the third print job Job3. This will be at 6000/100=60 minutes from the start moment in time, i.e. 01:00 h.

A fourth moment in time that the supply material output holder will be full is after printing 8000 A4's for the third print job Job3. This will be at 8000/100=80 minutes from the start moment in time, i.e. 01:20 h.

A fifth moment in time that the supply material output holder will be full is after printing 10000 A4's for the third print job Job3. This will be at 10000/100=100 minutes from the start moment in time, i.e. 01:40 h.

A sixth moment in time that the supply material output holder will be full is after printing 2000 A4's for the fourth print job Job4. This will be at 2000/50=40 minutes from 01:40 h., i.e. at 02:20 h.

The determined moments in time after the first moment in time apply to recurring depletions of the supply material output holder. All the moments in time 00:20 h, 00:40 h, 01:00 h, 01:20 h, 01:40 h and 02:20 h are determined simultaneously in one moment at or near the start moment in time 00:00 h. All print jobs scheduled in a print job scheduling scheme are taken into account with respect to the print job specifications of the scheduled print jobs and set and/or specified print velocities for the scheduled print jobs.

The given example of Job3 and Job4 is rather uncomplicated for convenience reasons, but more complicated schedules of print jobs, number of supply materials and/or number of supply material output holders may be envisioned to fall in the scope of the invention.

For convenience reasons it is assumed in this example that the supply material output holder is totally emptied. If a partial emptying is used for depletion, the partial emptying is taken into account when determining the moment in time of the first depletion and the recurring depletions.

For convenience reasons it is assumed in this example that one supply material output holder is used. The scope of the invention also extends to the use of a plurality of supply material output holders. The plurality of supply material output holders may become loaded with a same or a different supply material.

At each moment in time-the first, second, third, fourth, fifth and sixth moment in time as mentioned here-above-the print jobs are scheduled again and the moments in time are again determined during and/or after the depletion of the supply material output holder.

When a new print job is submitted to the printing system and arrives at the print job queue in the control unit, the new print job is scheduled and moments in time of recurring depletions are established for the supply material to be used during printing of the new print job.

According to an embodiment the method comprises the step of receiving a percentage of the maximum capacity of the supply output holder, which percentage is used for determining the degree of depletion at the determined moment in time. This is advantageous in case a complete depletion of the supply material output holder has a larger chance on print errors, like paper jams, ink pollution, etc. The percentage may be received via the user interface of the printing system by means of operator input or user input. The percentage may also be set as a system setting of the printing system. The capacity of the supply material output holder may also be dependent on a workflow setting of the printing system. A workflow setting may be to assign a different supply material output holder to each print job or to each kind of supply material. Another workflow setting may be a setting that links a second supply material output holder to a first supply material output holder in case a first supply material output holder becomes loaded to its predetermined maximum capacity.

In a second step S2 it is checked if there are determined moments in time left which are not yet scheduled. If there are no moments in time left, the method proceeds to the end point B. If there is still a moment in time to be scheduled, the method proceeds to a third step S3.

In a third step S3 a depletion event of emptying the supply material output holder is scheduled in the scheduling scheme for the selected moment in time.

Scheduling of the depletion events may take place in the control unit of the printing system. Scheduling of a depletion event may be on a time regular basis, for example, at each depletion of the supply material output holder or at each arrival of a new print job at the printing system. The scheduling of the depletion events for the plurality of moments in time determined in the first step S1, is executed for all depletion events together and anyway before the printing of the at least one scheduled print job. In a further embodiment the method comprises the step of displaying the scheduling scheme at the user interface including a display of the plurality of the scheduled depletion events. The display of the plurality of the scheduled depletion events may be established by means of depletion event display items.

FIG. 4-6 shows user interface windows of the printing system according to the invention for the examples of Job1 and Job2. Mutatis mutandis, similar user interface windows may be envisioned for the examples of Job3 and Job4, wherein the user interface windows comprise the depletion event display items to indicate the moments in time of the depletion events.

In a further embodiment a user interface window of the printing system comprises both the reload event display items and the depletion event display items in one schedule. The display of the plurality of the scheduled depletion events may be established by means of depletion event display items, like vertical bars as in FIG. 4 and FIG. 5. Other shapes and colouring of the depletion event display items than the shapes and colouring of the reload event display items may be envisioned in order to distinguish the depletion event display items from the reload event display items.

In a further embodiment the method comprises the step of taking into account an uncertainty time period around each depletion event. Similar to an uncertainty time periods of a reload event, the uncertainty time period for the depletion event may be expressed by the width of the depletion display items. An uncertainty time period may be expressed in time units or in number of prints. The width of each of the depletion display items represents the uncertainty period around the respective depletion events. For example, it is substantially 100% certain that the depletion event will take place in the uncertainty period around the depletion event indicated by the width of the corresponding depletion event display item.

In a further embodiment the method comprises the step of taking accumulatively taking into account the uncertainty time periods around the depletion events.

Mutatis mutandis, the accumulation of the uncertainty time periods around the depletion events may be visualised by means of the width of the successive depletion event display items as shown in FIG. 6 for the reload event display items.

The skilled person will recognise that other embodiments are possible within the scope of the appended claims.

The invention claimed is:

1. A method for scheduling a reload of a same kind of supply material in a cut sheet printing system, the cut sheet printing system comprising a print engine capable of printing at a settable print velocity while using the same kind of supply material, a control unit for controlling a print job queue comprising at least one print job scheduled to be printed by means of a scheduling scheme while using the same kind of supply material, a supply material input holder for holding the same kind of supply material, and a user interface for interacting with a user of the cut sheet printing system, the method comprising the steps of:
   a) determining a plurality of moments in time that the supply material input holder is empty with respect to the same kind of supply material; and
   b) simultaneously scheduling for each determined moment in time of the plurality of moments in time a reload event of reloading the supply material input holder with the same kind of supply material in the scheduling scheme,
   wherein the plurality of moments in time is determined by taking into account the total planned usage of the supply material from the supply material input holder according to print job specifications of the at least one print job scheduled in the print job queue and a capacity of the same kind of supply material input holder with respect to the properties of the supply material, and
   wherein each of the determined moments in time is established on the basis of the settable print velocity of the cut sheet printing system with respect to the at least one print job in the print job queue.

2. The method according to claim 1, wherein the cut sheet printing system comprises a plurality of supply material input holders and the method comprises the steps of:
   assigning each supply material input holder of the plurality of supply material input holders to a kind of supply material; and
   applying the steps a)-b) for each supply material input holder of the plurality of supply material input holders.

3. The method according to claim 1, wherein the method comprises the step of displaying the scheduling scheme at the user interface including the display of the plurality of scheduled reload events.

4. The method according to claim 3, wherein the method comprises the step of notifying the operator of the cut sheet printing system by means of the user interface for each scheduled reload event when the moment in time of the scheduled reload event is near.

5. The method according to claim 4, wherein the method comprises the step of receiving a percentage of the capacity of the supply material input holder, which percentage is used for determining the degree of reload at each of the plurality of moments in time.

6. The method according to claim 5, wherein the method comprises the step of receiving a value of an amount of the same kind of supply material, which amount is default for reloading the supply material input holder at the plurality of determined moments in time.

7. The method according to claim 1, wherein the method comprises the steps of establishing an uncertainty time period for the reload event to take place and for each scheduled reload event displaying the corresponding uncertainty period at the user interface.

8. The method according to claim 7, wherein the method comprises the step of for a reload event accumulating the uncertainty periods of the determined moments in time before and including the reload event and for a reload event displaying the accumulated uncertainty periods at the user interface.

9. A cut sheet printing system comprising:
a print engine capable of printing at a settable print velocity while using a same kind of supply material;
a control unit for controlling a print job queue comprising at least one print job scheduled to be printed by means of a scheduling scheme using the same kind of supply material;
a supply material input holder for holding the same kind of supply material; and
a user interface for interacting with a user of the cut sheet printing system, wherein the control unit is configured:
a) to determine a plurality of moments in time that the supply material input holder is empty with respect to the same kind of supply material; and
b) to simultaneously schedule for each determined moment in time of the plurality of moments in time a reload event of reloading the supply material input holder with the same kind of supply material in the scheduling scheme,
wherein the plurality of moments in time is determined by taking into account the total planned usage of the same kind of supply material from the supply material input holder according to print job specifications of the at least one print job scheduled in the print job queue and a capacity of the supply material input holder with respect to the same kind of supply material, and
wherein each of the determined moments in time is established on the basis of the settable print velocity of the print engine with respect to the at least one print job in the print job queue.

10. The cut sheet printing system according to claim 9, further comprising a plurality of supply material input holders, and
wherein the control unit is configured to assign each supply material input holder of the plurality of supply material input holders to a kind of supply material and to apply actions a)- b) for each supply material input holder of the plurality of supply material input holders.

11. A non-transitory recording medium comprising:
computer executable program code configured to instruct a computer to perform the method according to claim 1 in a cut sheet printing system, the printing system comprising:
a print engine capable of printing at a settable print velocity while using a same kind of supply material;
a control unit for controlling a print job queue comprising at least one print job scheduled to be printed by means of a scheduling scheme using the same kind of supply material;
a supply material input holder for holding the same kind supply material; and
a user interface for interacting with a user of the cut sheet printing system,
wherein the control unit is configured:
a) to determine a plurality of moments in time that the supply material input holder is empty with respect to the same kind of supply material; and
b) to simultaneously schedule for each determined moment in time of the plurality of moments in time a reload event of reloading the supply material input holder with the supply material in the scheduling scheme,
wherein the plurality of moments in time is determined by taking into account the total planned usage of the same kind of supply material from the supply material input holder according to print job specifications of the at least one print job scheduled in the print job queue and a capacity of the supply material input holder with respect to the same kind of supply material, and
wherein each of the determined moments in time is established on the basis of the settable print velocity of the print engine with respect to the at least one print job in the print job queue.

* * * * *